United States Patent [19]

Foucht

[11] 4,260,514

[45] Apr. 7, 1981

[54] URETHANE FOAM COMPOSITIONS

[75] Inventor: Millard E. Foucht, Newark, Ohio

[73] Assignee: Owens-Corning Fiberglas Corporation, Toledo, Ohio

[21] Appl. No.: 107,480

[22] Filed: Dec. 26, 1979

[51] Int. Cl.$^3$ ............................................... C09K 3/00
[52] U.S. Cl. .................................... 252/182; 252/8.1; 252/62; 428/921; 521/167; 521/171; 521/176; 521/177; 521/906
[58] Field of Search ...................... 106/18.11; 252/8.1, 252/62, 182; 428/920, 921; 521/906, 177, 167, 171, 176

[56] References Cited

U.S. PATENT DOCUMENTS

| | | | |
|---|---|---|---|
| 3,222,305 | 12/1965 | Lanham | 521/906 X |
| 3,302,999 | 2/1967 | Mitchell | 252/62 X |
| 3,574,150 | 4/1971 | Jefferson et al. | 252/62 X |
| 3,717,597 | 2/1973 | Hesskamp et al. | 521/906 X |
| 3,793,237 | 2/1974 | Watkinson | 521/906 X |
| 3,821,067 | 6/1974 | Taylor et al. | 428/921 |
| 4,145,488 | 3/1979 | Hayden | 521/906 X |

*Primary Examiner*—Leland A. Sebastian
*Attorney, Agent, or Firm*—Ronald C. Hudgens; Philip R. Cloutier

[57] ABSTRACT

A polyurethane foamable composition comprising a brominated diol and three polyols is disclosed. The resulting foam formed by reacting these polyols and a diol with an isocyanate has a flame spread of 25 or less and contains a smaller quantity of halogen compounds than usually contained in polyurethane foamable compositions. This combination of polyols and flame retardant shows improved physical strengths and adhesion to primed tank substrates between temperatures of 100° to 160° F.

10 Claims, No Drawings

URETHANE FOAM COMPOSITIONS

BACKGROUND OF THE INVENTION

This invention relates to urethane foam compositions.

In one of its more specific aspects, this invention relates to low flame spread, spray-in-place foams suitable for insulation.

The use of low flame spread urethane-based foams as insulation is well known. Such materials are widely used on vertical surfaces, such as storage tanks, where application by spraying is practical. Such materials usually contain various halogen and phosphorous compounds in order to impart a flame spread (ASTME-84) of 25 or less. The inclusion of such halogen compounds in foams contributes significantly to their costs and considerable economic benefits could be realized if a suitable foam system could be developed which resulted in a reduction in the quantity of halogens, but which foams otherwise possessed satisfactory flame spread and insulation values. The use of halogens also results in reduced physical properties of the foams, such properties being compressive strength, tensile strength, dimensional stability and the like.

The present invention provides such foams. While, in general, the prior art foams of comparable flame spread contain about 6 weight percent bromine and about 4.5 weight percent chlorine, the foams of this invention contain about 2.5 weight percent bromine and about 2.5 weight percent chlorine. This invention further improves the commercial usefulness of polyurethane spray foams by providing a foamable composition incorporating a brominated diol. These foams have a 25, or less, flame spread, and exhibit excellent foam-substrate adhesion when applied to fuel oil storage tanks at temperatures between 100° and 160° F.

STATEMENT OF THE INVENTION

According to this invention, there is provided a flame retardant foam comprising, as a first component, an oxyalkylated Mannich base reaction product of a phenol, an aldehyde and an alkyanol amine; as a second component, the oxyalkylated Mannich base reaction product of nonylphenol, an aldehyde and an alkyanol amine; as a third component, an oxyalkylated polyamine; and, as a fourth component, a brominated diol, preferably dibromoneopentyl glycol.

Other materials which can be included in the foamable compositions include conventionally included materials in their usual amounts, these materials including surfactants, catalysts and blowing agents.

In a more preferred embodiment of the present invention, the composition contains glycol in an amount of about 3 percent to improve the handling characteristics of the material.

The urethane formulations of this invention comprise a two-ingredient system, the two ingredients being mixed together on an equal volume basis. The resulting mixture is processed through standard urethane mixing equipment or through spray equipment onto the surface to be covered.

The first ingredient comprises a suitable isocyanate or reactive—NCO containing compound. This isocyanate will comprise from about 42.5 to about 48.5 parts per 100 parts by weight of the product urethane foam.

Suitable isocyanates or reactive—NCO containing compounds which can be employed in practicing this invention include 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene -2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene -2,4,6-triisocyanate; 3,-methyl-4,6,4'-triisocyanate diphenyl methane; 2,4,4'-triisocyanate diphenyl; 2,4,4'-triisocyanate diphenyl ether; long chain hydrocarbons and substituted hydrocarbons terminated with—NCO radicals and mixtures thereof. Prepolymers having reactive isocyanate or—NCO groups can also be employed.

A particularly suitable isocyanate is designated Mondur MR, commercially available from Mobay Chemical Co., Pittsburgh, Pennsylvania.

Mondur MR is a polymeric polyaryl-polyisocyanate prepared by phosgenation of aniline and formaldehyde in a mineral acid, the polyisocyanate having from about 31.5 to about 32% active—NCO groups and a viscosity of about 200 cps. at 25° C.

The second ingredient will be comprised of the aforementioned first, second, third and fourth components.

The first component is the oxyalkylated Mannich base reaction product of phenol, an aldehyde and an alkanol amine to a hydroxyl number within the range of about 520 to about 540. The first component is present in said second ingredient in an amount within the range of from about 10 to about 40 weight percent. It will preferably be contained in an amount of about 25 weight percent.

Any suitable Mannich raction product can be employed. One suitable material is commercially available as R-350-X from Jefferson Chemical Co., Houston, Texas. It is preferably included in the second ingredient in an amount of about 25 weight percent.

The second component is the oxyethylated Mannich base reaction product of nonylphenol, an aldehyde and an alkanol amine to a hydroxyl number within the range of from about 430 to about 490. This second component is present in the second ingredient in an amount within the range of from about 6 to about 25 weight percent. It is preferably included in the second ingredient in an amount of about 12.7 weight percent.

Any suitable second component can be employed. One suitable material is commercially available as R-650-X from Jefferson Chemical Co., Houston, Texas. It is preferably included in the second ingredient in an amount of about 12.7 weight percent.

The third component is any oxyalkylated polyamine. Any oxyalkylated polyamine can be employed. However, preferably, it will be a propoxylated product of diethylenetriamine. This third component is present in the second ingredient in an amount within the range of from about 4 to about 20 weight percent. It is preferably included in the second ingredient in an amount of about 12 weight percent.

Any suitable third component can be employed. One suitable material is commercially available as Polyol LA 700 from Union Carbide, New York, N.Y. It will be contained in the second ingredient in an amount of about 12 weight percent.

The fourth component comprises a brominated diol. Any suitable brominated diol can be employed. Preferably, however, the fourth component will comprise a mixture of dibromoneopentyl glycol with phosphonates and other polyols, for example, a 5000 m.w. polyol, in amount of 60,30 and 10 weight percent, respectively. The fourth component will be included in the second ingredient in an amount within the range of from about 6 to about 25 weight percent and preferably in an amount of about 14 weight percent.

Any suitable fourth component can be employed. One suitable material is commercially available from Dow Chemical Co., Midland, Michigan as XNS-50054-2. It will be contained in the second ingredient in an amount of about 14 weight percent.

Other materials which can be included in the foam compositions of this invention, and their weight percentage inclusion, are as follows:

| | |
|---|---|
| dipropylene glycol | 0.5 to 4 |
| ethylene glycol | 0.5 to 4 |
| foaming agent(freon) | 20 — 38 |
| surfactant | 0.4 — 1.5 |
| catalyst | 0.01 to 1 |

EXAMPLE I

This example sets forth the formulation and method of producing the second ingredient of this invention.

The second ingredient was prepared from the following materials:

| Material | Weight Percent |
|---|---|
| First Component (R-350-X) | 25.0 |
| Second Component (R-650-X) | 12.7 |
| Third Component (LA 700) | 12.0 |
| Fourth Component (XNS-50054-2) | 14.0 |
| Dipropylene glycol | 2.5 |
| Ethylene glycol | 3.0 |
| Freon | 30.0 |
| Silicone surfactant | 0.6 |
| Catalyst | 0.2 |

The materials comprising the second ingredient can be mixed in order. However, a preferred mixing procedure for the second ingredient is as follows: The first, second, third and fourth components are charged to a mixing blender. In order, the dipropylene glycol and ethylene glycol are added to the blender and the resulting blend is stirred for fifteen minutes until completely mixed. The Freon is added with stirring and is completely blended in. The surfactant and catalyst are then added and the resulting mixture is mixed for 30 minutes during which period the temperature is held at 68°–70° F.

EXAMPLE II

The following properties are representative of the foam produced upon mixing the two ingredient system.

| Property | Value |
|---|---|
| Density, PCF | 2.3 |
| Compressive Strength, psi | |

-continued

| Property | Value |
|---|---|
| Parallel | 39.5 |
| Lengthwise | 20.9 |
| Widthwise | 20.6 |
| Thermal Conductivity | |
| Initial, BTU/HR/Sq ft/°F. | 0.115 |
| Aged 3 mos. @ 140° F. | 0.161 |
| Surface Burning Characteristics | |
| Flame Spread @ 1" Tk. | 25 |
| Smoke Developed | 290 |
| Compressive Modulus, psi | |
| Parallel | 1340 |
| Lengthwise | 533 |
| Widthwise | 532 |
| Dimensional Stability @ | |
| 28 days, 158° F. 95% RH | 8.8 |
| Tensile Adhesion to Primed Steel | |
| (@100–160° F.), psi. | 50–64 |

It will be seen from the above that the product of this invention is of superior quality. Also, as mentioned previously, it possesses the economic advantage that in containing lesser quantities of the halogens, it is producible at lower cost.

I claim:

1. A composition comprising a first ingredient and a second ingredient, said second ingredient comprising:
   (a) the oxyalkylated Mannich base reaction product of phenol, an aldehyde and an alkanol amine;
   (b) the oxyalkylated Mannich base reaction product of nonylphenol, an aldehyde and an alkanol amine;
   (c) an oxyalkylated polyamine; and,
   (d) a brominated diol.

2. The composition of claim 1 in which said first ingredient comprises a reactive—NCO containing compound.

3. The composition of claim 1 in which (a) has a hydroxyl number within the range of from about 520 to about 540.

4. The composition of claim 1 in which (b) has a hydroxyl number within the range of from about 430 to about 490.

5. The composition of claim 1 in which (c) is a propoxylated product of diethylenetriamine.

6. The composition of claim 1 in which (d) comprises a mixture of dibromoneopentyl glycol, phosphonates and polyols.

7. The composition of claim 1 in which said second ingredient is comprised of from about 10 to about 40 weight percent of (a), of from about 6 to about 25 weight percent of (b), of from about 4 to about 20 weight percent of (c) and from about 6 to about 25 weight percent of (d).

8. The composition of claim 1 in which said second ingredient is comprised of about 25 weight percent of (a), of about 12.7 weight percent of (b), of about 12 weight percent of (c) and of about 14 weight percent of (d).

9. The composition of claim 1 comprising in weight percent, dipropylene glycol in an amount of from 0.5 to 4, ethylene glycol in an amount of from 0.5 to 4, a foaming agent in an amount from 20–38, a surfactant in an amount from 0.4 to 1.5 and a catalyst in an amount from 0.01 to 1.

10. The composition of claim 6 in which (d) is comprised of about 60 weight percent dibromoneoopentyl glycol, about 30 weight percent of phosphonates and about 10 weight percent of a 5000 molecular weight polyol.

* * * * *